DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 19, 1972

905 O.G. 454

T905,011

METALLIZING COMPOSITIONS CONTAINING THERMOFLUID VEHICLES

Oliver A. Short, Wilmington, Del., assignor to E. I. du Pont de Nemours and Company, Wilmington, Del.

Continuation of abandoned application Ser. No. 137,082, Apr. 23, 1971. This application Mar. 13, 1972, Ser. No. 234,402

Int. Cl. C09d *5/24*

U.S. Cl. 106—1

No Drawing. 7 Pages Specification

Metallizing compositions containing finely divided noble metals and thermofluid vehicles are printed and fired onto organic bonded ceramic dielectrics or matured dielectric substrates to form electrodes and/or microcircuitry. The thermofluid vehicles comprise (a) 40–80% paraffin wax, (b) 5–50% stearic acid, (c) 1–20% of a member from the group consisting of rosin, a rosin derivative and a mixture thereof and (d) 1–10% of a viscosifier selected from the group consisting of ethyl cellulose, ethyl hydroxy ethyl cellulose and a mixture thereof.